United States Patent
Roop et al.

(10) Patent No.: US 10,276,057 B1
(45) Date of Patent: Apr. 30, 2019

(54) NEGATIVE BUOYANCY TETHERED TRAINING SYSTEM

(71) Applicant: Kitty Hawk Corporation, Mountain View, CA (US)

(72) Inventors: Joseph Roop, Sunnyvale, CA (US); Cameron Robertson, San Mateo, CA (US); Todd Reichert, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 354 days.

(21) Appl. No.: 15/230,728

(22) Filed: Aug. 8, 2016

(51) Int. Cl.
*A62C 5/02* (2006.01)
*G09B 9/42* (2006.01)
*G09B 9/08* (2006.01)

(52) U.S. Cl.
CPC ............ *G09B 9/42* (2013.01); *A62C 5/02* (2013.01); *G09B 9/085* (2013.01)

(58) Field of Classification Search
None
See application file for complete search history.

(56) References Cited

U.S. PATENT DOCUMENTS 2,779,421 A * 1/1957 Rust .................. B64D 1/16
169/26

* cited by examiner

*Primary Examiner* — James B Hull
(74) *Attorney, Agent, or Firm* — Van Pelt, Yi & James LLP (57) ABSTRACT

A training system includes a tether configured to removably attach a training device to an overwater aircraft which is configured to at least take off and land over water. The training system also includes the training device which has a negative buoyancy and has an out-of-water weight which prevents sustained flight by the overwater aircraft when the training device is at least partially out of the water.

11 Claims, 7 Drawing Sheets

NEGATIVE BUOYANCY TETHERED TRAINING SYSTEM

BACKGROUND OF THE INVENTION

New types of aircraft are being developed which offer different flight experiences than those offered by existing types of aircraft. As these new types of aircraft are developed and introduced to the public, new problems which were not previously encountered will be exposed. New devices which solve such problems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a training device for use with an overwater aircraft are described herein. The training device is able to be removably attached to an overwater aircraft which is configured to take off and land over water. For example, the training device may be attached by a carabiner and a tether to the underside of the overwater aircraft. The training device is designed to sink in the water (i.e., it has a negative buoyancy) and in various embodiments can limit the maximum altitude the overwater aircraft is able to fly at, slow down the overwater aircraft, and/or provide feedback to help a student pilot learn how to safely fly the overwater aircraft. This permits a student pilot to more safely learn how to fly an overwater aircraft.

Figure 1:
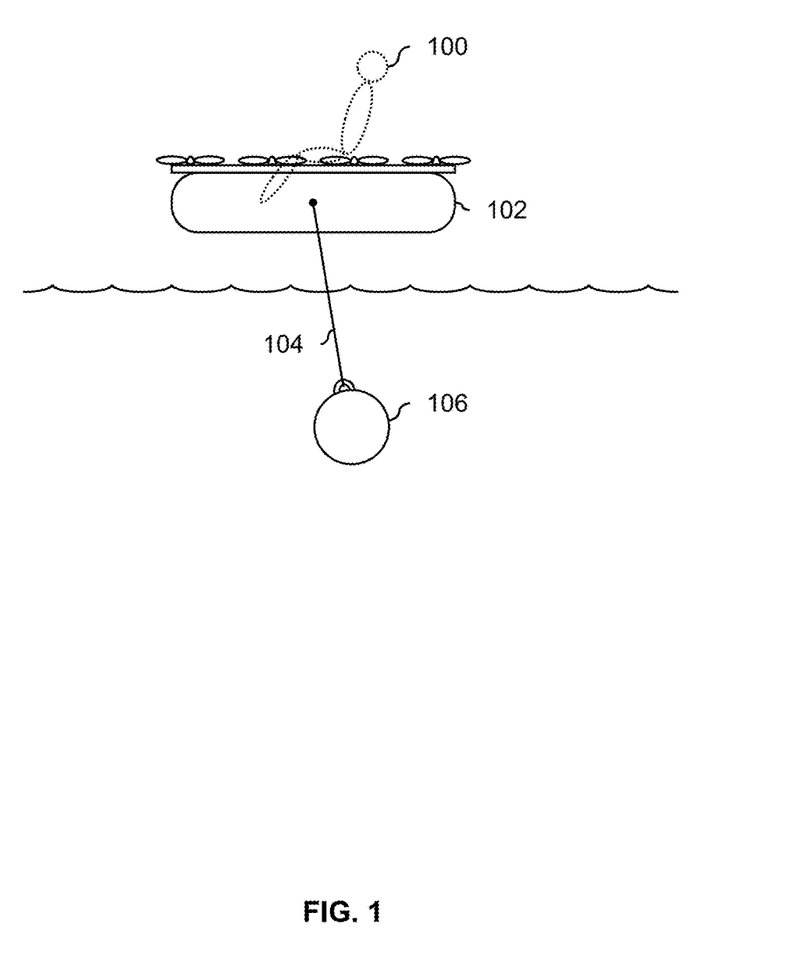
FIG. 1 is a diagram illustrating an embodiment of a submerged training device which is attached to an overwater aircraft.

FIG. 1 is a diagram illustrating an embodiment of a submerged training device which is attached to an overwater aircraft. In the example shown, a tether ball (106) is attached to an overwater aircraft (102) via a tether (104). The tether ball (or, more generally, training device) in this example has a spherical shape with a handle to which the tether (104) is connected or otherwise tied. The other end of the tether is removably connected to the aircraft, for example using a carabiner. Alternatively, the tether may simply be tied to the aircraft. In some embodiments, a training device is attached to an aircraft when the rotors or propellers are off and the aircraft is floating on water. A person may swim under the aircraft, or be on the aircraft and remove the tether from some dock or pier attachment, and attach the tether to the underside of the aircraft.

In this example, a student pilot (100) is learning how to fly the overwater aircraft (102). One characteristic of this overwater aircraft is that there is no cockpit or fuselage and for safety reasons there may be no seat belt (e.g., the aircraft is designed to be flown over water and the pilot may drown if (s)he is attached to a submerged or flipped aircraft). It is therefore a real possibility that a student pilot could be tossed, possibly from a great height, from the overwater aircraft.

Another characteristic of this overwater aircraft is that, unlike some other types of aircraft, this overwater aircraft only has a single seat. This means that an instructor cannot be on the aircraft with the student pilot to help teach the student pilot how to fly the overwater aircraft. An instructor is therefore not able to take the controls of the overwater aircraft if the student pilot panics and/or requires assistance.

For these reasons, training device 106 (which limits the capabilities of the overwater aircraft so that it is slower than normal and/or cannot fly as high as it normally can) is useful. It is noted that the exemplary aircraft shown here is merely exemplary and the tether ball training system can be used with a variety of aircraft.

When submerged as shown here, the submerged tether ball (106) has a perceived weight which pulls on the overwater aircraft (102), slowing the aircraft down. According to Archimedes' principle, when the tether ball is submerged in the water (as shown in this figure) the perceived weight of the tether ball is:

Perceived weight=Out-of-water weight−Weight of water displaced by tether ball

In one prototype system, the perceived weight (i.e., when submerged) is ~20 lbs. and the corresponding out-of-water weight is ~135 lbs. The volume of the tether ball in this example therefore displaces ~115 lbs. of water. In some embodiments, a mooring ball is used for the tether ball. A mooring ball typically floats on the surface of water and therefore it is weighted to have the desired out-of-water weight of 115 lbs. (as an example). In various embodiments, a mooring ball may be weighted by externally attached weights to the mooring ball (e.g., to the handle) or by filling the interior of the mooring ball with weights (e.g., water or lead pellets).

As described above, one benefit of the exemplary tether ball is that it slows down the overwater aircraft, without having to reconfigure the aircraft. It may not be easy, for example, to "dial down" the rotors or propellers of an aircraft in order to slow it down or in general make it less powerful for a student pilot. In contrast, clipping or tying a training device (such as a tether ball) to an aircraft is relatively simple and the cost to construct a training device is relatively low.

Figure 2:
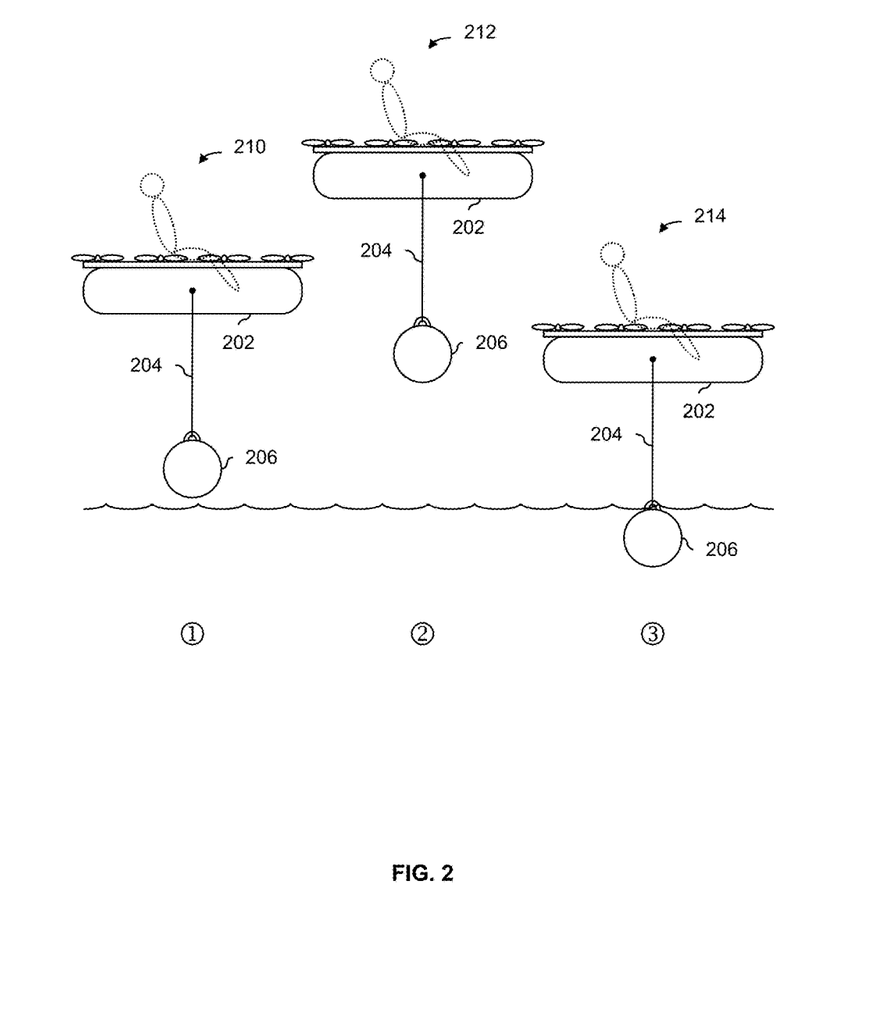
FIG. 2 is a diagram illustrating an embodiment of an out-of-water training device which is attached to an overwater aircraft.

The exemplary tether ball is also helpful because it prevents a student pilot from flying too high. The following figure shows an example of this.

FIG. 2 is a diagram illustrating an embodiment of an out-of-water training device which is attached to an overwater aircraft. In diagram 210, the student pilot has flown the overwater aircraft (202) high enough so that the tether ball (206) is out of the water. In this example, diagrams 210, 212, and 214 shows snapshots in time of the same system.

Once the tether ball is out of the water as is shown in diagram 210, the weight of the tether ball switches from its perceived weight (in this example, ~20 lbs.) and to its out-of-water weight (in this example, ~135 lbs.). The out-of-water weight of the tether ball is specifically selected or otherwise set so that the rotors of the overwater aircraft cannot support the combined weight of the out-of-water tether ball, the pilot, and the aircraft. To put it another way, the aircraft is unable to maintain sustained flight with the tether ball out of the water. Although the aircraft may briefly fly with the tether ball out of the water (see, e.g., diagram 212), at some point the aircraft will be forced to descend until the tether ball becomes submerged again (see, e.g., diagram 214), at which point the weight of the tether ball switches from the out-of-water weight to the lighter perceived weight when submerged.

See, for example, the sequence of diagrams. In diagram 210, the tether ball (206) is out of water. The aircraft is briefly able to fly with the tether ball out of the water, as is shown in diagram 212 with the aircraft and tether ball at a higher height compared to diagram 210. Finally, in diagram 214, the aircraft is forced to descend and the tether ball is once again submerged in the water.

With a student pilot, it may be desirable to limit the maximum altitude that an aircraft is able to fly to (e.g., lower than its normal or regular maximum altitude). As is shown in this example, some aircraft have no cockpit or fuselage and the pilot can fall off of the aircraft. The likelihood of a fall resulting in serious injury or death increases with height, even over water, and therefore it may be desirable to limit the maximum altitude even more that the aircraft's normal ability. Clipping or otherwise connected a training device to an aircraft to achieve this is relatively easy to do. In contrast, "tweaking" the configurations or settings of the rotors or motors to limit the maximum altitude may be difficult or impossible.

The length of the tether (204) may be selected based on what height is deemed too high for a student pilot. For example, for early lessons, a relatively short tether length may be used. For a more experienced student pilot, a longer tether may be used.

The out-of-water weight of the tether ball may be selected (e.g., based on the strength of the rotors, the weight of the aircraft, and/or the weight of the lightest expected student pilot) so that the aircraft is forced to descend if the tether ball is pulled out of the water. In other words, a training device can have the desired property shown here for a variety of aircraft (e.g., with different rotor strengths, different weights, etc.) and/or a variety of student pilots.

Although this figure shows the tether ball coming (completely) out of the water, in some embodiments, the out-of-water weight of the tether ball is so substantial that it is always at least partially submerged.

Figure 3:
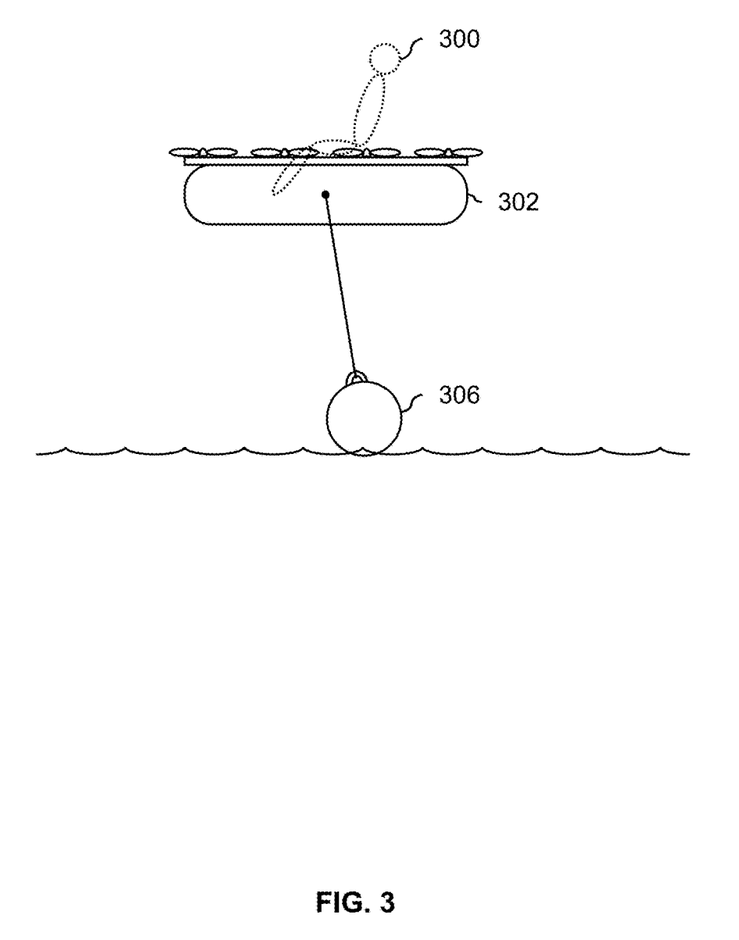
FIG. 3 is a diagram illustrating an embodiment of a training device which is dragged across the surface of water by an overwater aircraft.

In the examples above, the training device attached to the aircraft has a spherical shape. The following figure illustrates an example of why it may be beneficial to use a training device with a spherical or similar shape.

FIG. 3 is a diagram illustrating an embodiment of a training device which is dragged across the surface of water by an overwater aircraft. In this example, a student pilot (300) is flying the overwater aircraft (302) at a height where the tether ball (306) is dragged across the surface of a body of water. In this example, the tether ball has a spherical shape.

In one prototype (not shown), a cylindrically shaped training device was attached to the aircraft and tested. However, when the overwater aircraft was at a height where the cylindrically shaped training device was dragged across the surface of the water, the cylindrically shaped training device would ski on the surface of the water. In contrast, another prototype with a spherical shape did not ski on the surface of the water as much and therefore offered more resistance and slowed the aircraft down more than the cylindrically shaped prototype. Therefore, in some embodiments, a spherically shaped training device may be desired over other shapes (e.g., a cylinder or a cube) which may present a relatively flat surface on which the training device could undesirably ski on the surface of the water. Other three dimensional shapes which similarly do not ski on the surface of water may also be used (e.g., an ovoid or a spheroid).

Figure 4:
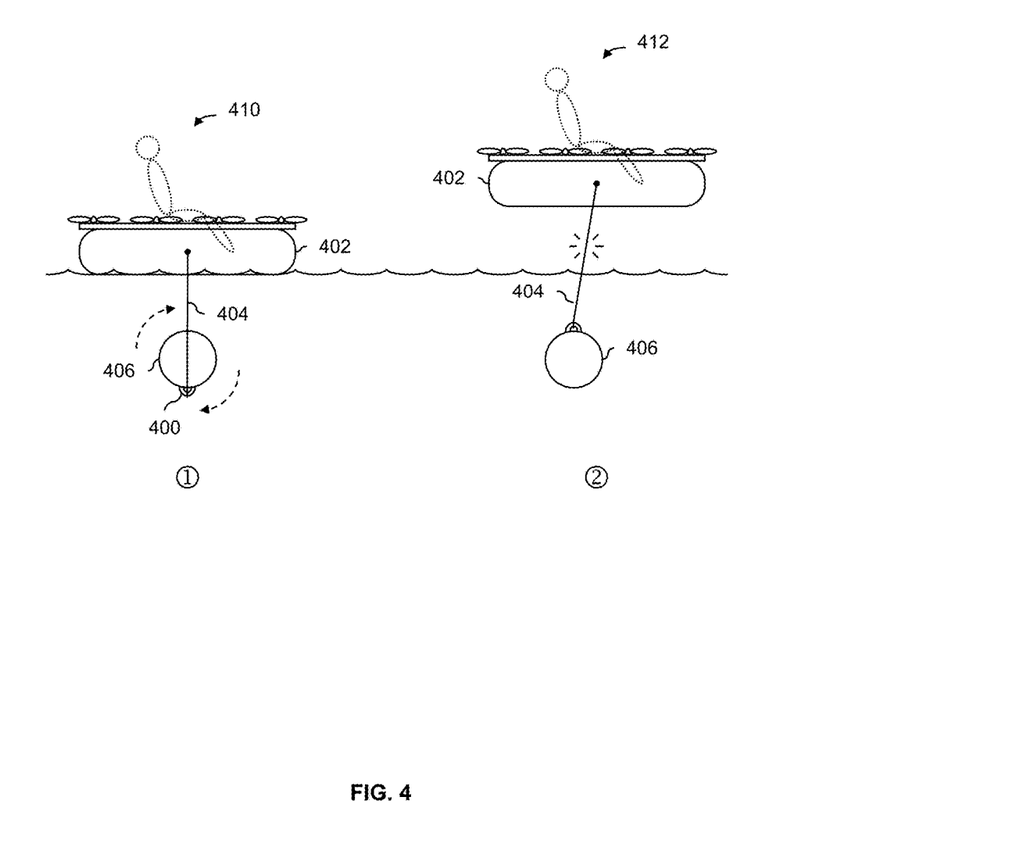
FIG. 4 is a diagram illustrating an embodiment of a training device which is configured to be oriented with the connection point facing downward.

In some embodiments, a training device is designed or otherwise configured to have a particular orientation when the overwater aircraft is not pulling on the training device. The following figure shows one such example and explains why this may be beneficial.

FIG. 4 is a diagram illustrating an embodiment of a training device which is configured to be oriented with the connection point facing downward. In this example, the student pilot is learning how to take off. In diagram 410, an overwater aircraft (402) is floating on the surface of the water and the attached tether ball (406) is submerged. The overwater aircraft has not taken off yet, and so the aircraft is not pulling on the tether ball yet. It is noted that the perceived weight of the tether ball (400) is heavy enough to cause the tether ball to sink, but not heavy enough to cause the aircraft to sink. In some applications, it is desirable to have the tether ball sink so that the tether is taut does not get tangled with the aircraft when in use.

In diagram 410, the tether ball (406) is oriented with the connection point (400) facing downward. The connection point of the tether ball (or, more generally, training device) is the point where the tether (404) and tether ball (406) are connected, which in this example is where the handle is.

Some examples of how a training device may configured or designed to have this orientation are described in more detail below.

As the student pilot steers the aircraft through a takeoff (going from diagram 410 to diagram 412), the tether ball rotates so that the connection point (404) is oriented upward. This rotation in the water occurs with relatively low resistance (e.g., because of the substantially spherical shape of the tether ball) and so the pilot feels little to no resistance during this part of the takeoff as the tether ball rotates.

Once the tether ball rotates all it can, the pilot will feel more resistance as the tether ball is pulled through the water. If the pilot performs a slow and gradual take off (which is desired), the pilot will feel little or no jerking once the tether ball begins to be dragged through the water. However, if the pilot performs a takeoff that is too quick or abrupt, the pilot will feel a jerk when the tether ball's rotation is completed and the tether ball begins to be dragged through the water. See diagram 412. This sensation is helpful in teaching student pilots how to take off in safe and pleasant manner. Therefore, in some embodiments it is desirable to have a training device which is configured to be downward facing in this manner.

To ensure that a student pilot feels the strongest jerking sensation possible, in some embodiments the tether is inelastic. If the tether were instead elastic, the jerking might be less noticeable because the tether would stretch and the training device would not provide as much feedback.

In some embodiments, the tether is attached to the aircraft at or near the center of mass (e.g., preferably above the center of mass and undesirably below the center of mass). If the tether is attached to the aircraft too far away from the center of mass and the student pilot steers the aircraft into a sharp turn (e.g., there is significant and/or abrupt rotation on the pitch axis and/or the roll axis), the resistance from the training device may induce a moment on the overwater aircraft. If the moment is large enough, it may cause the overwater aircraft to flip over which would be dangerous for the student pilot. For this reason, it may be desirable to attach the tether to the aircraft at or near the center of mass.

In some embodiments, an aircraft is able to detect when the aircraft is in danger of flipping over (e.g., because of a moment induced by an attached training device) and the aircraft is able to correct itself. For such aircraft, it may not be necessary to attach the tether to the aircraft's center of mass. For example, if an aircraft has attitude command (e.g., the flight computer controls the pitch and roll of the aircraft and can automatically adjust the pitch and/or roll as needed to stabilize the aircraft) then it may not be necessary to attach the training device at or near the center of mass of the aircraft.

The following figures illustrate some examples of training devices which are configured to have a downward facing connection point.

Figure 5:
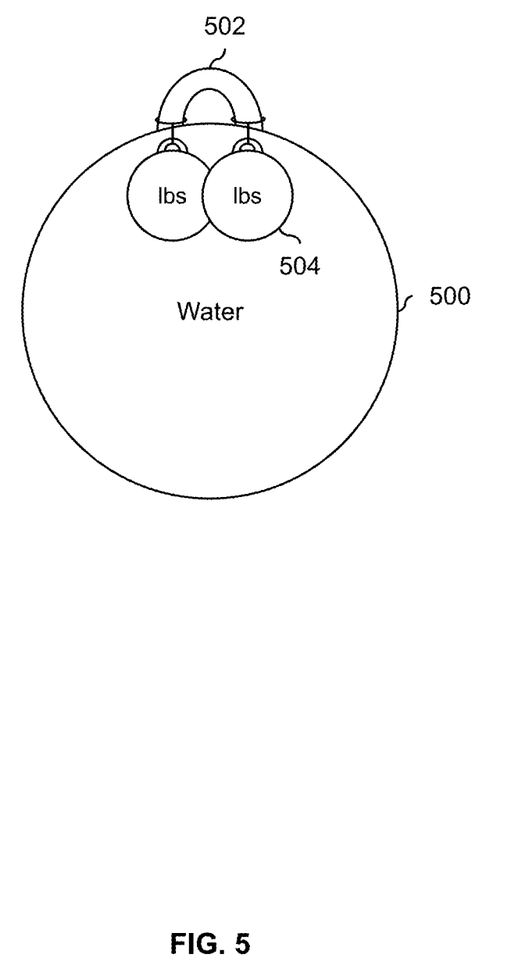
FIG. 5 is a diagram illustrating an embodiment of a training device with weights externally attached to the handle of the training device.

FIG. 5 is a diagram illustrating an embodiment of a training device with weights externally attached to the handle of the training device. In this example, a mooring ball (500) is used. The mooring ball is normally filled with air (since it normally floats) and has a handle (502) to which boats are normally moored. In this example, weights (504) are attached to the handle (502) of the mooring ball. In one example, the external weights are kettle balls. The interior of the mooring ball is filled with water. The total weight of the training device shown (i.e., the mooring ball and external weights) is greater than the weight of the water displaced by the training device so it has a negative buoyancy.

Since the exemplary training device is able to easily rotate in the water because of the mooring ball's round shape, the weights attached to the handle will cause the mooring ball to rotate when submerged such that the handle (i.e., connection point) is facing downward.

In one example of how the weights (504) are selected, the minimum weight is dictated by the desire to prevent sustained flight (by an attached aircraft) when the training device is out of the water. This may depend, as an example, on the strength of the rotors, the weight of the aircraft, and/or the lightest expected weight of a pilot. The maximum weight of the weights (504) may be dictated by the buoyancy of the attached aircraft. That is, the external weights should not be so heavy that they cause the attached aircraft to sink when the rotors are off and the aircraft is attempting to float on the surface of the water.

In some embodiments, using external weights is desirable because the weights may be adjusted for a variety of pilot weights, pilot experience levels, rotor strengths and/or training scenarios. For example, at a training center, many student pilots with different weights and/or experience levels may be learning how to fly a variety of aircraft. An adaptable or adjustable training device would be useful in such an environment.

Another benefit to the system shown is that it is relatively simple to construct. Also, the components may be easily obtained and connected together without any special manufacturing experience or equipment. The components are also relatively robust and can withstand a wet environment.

Figure 6:
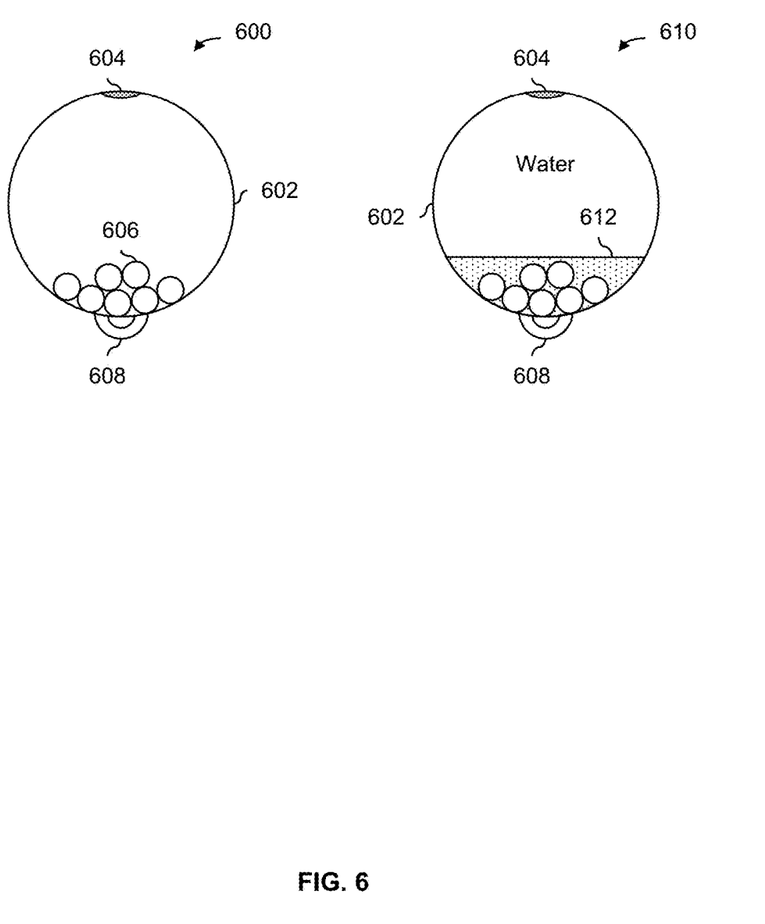
FIG. 6 is a diagram illustrating an embodiment of a training device with weights internally attached using an adhesive.

FIG. 6 is a diagram illustrating an embodiment of a training device with weights internally attached using an adhesive. In diagram 600, a mooring ball (602) has an opening (604) via which weights (606) are inserted into the mooring ball. For example, the weights may be lead pellets or other metal weights. As shown, the mooring ball is flipped upside down so that the handle (608) is facing down and the weights gather inside the mooring ball at or near the handle.

In diagram 610, an adhesive (612) is inserted into the mooring ball, again through the opening (604). The mooring ball is still upside down with the handle facing downward so that the weights and adhesive gather at or near the handle. The adhesive (612) sticks to the weights (606) as well as the inside of the mooring ball (602). Once the adhesive dries, the interior of the mooring ball is topped off with water. As configured, the mooring ball will always try to orient itself in the water with the handle facing downward.

Figure 7:
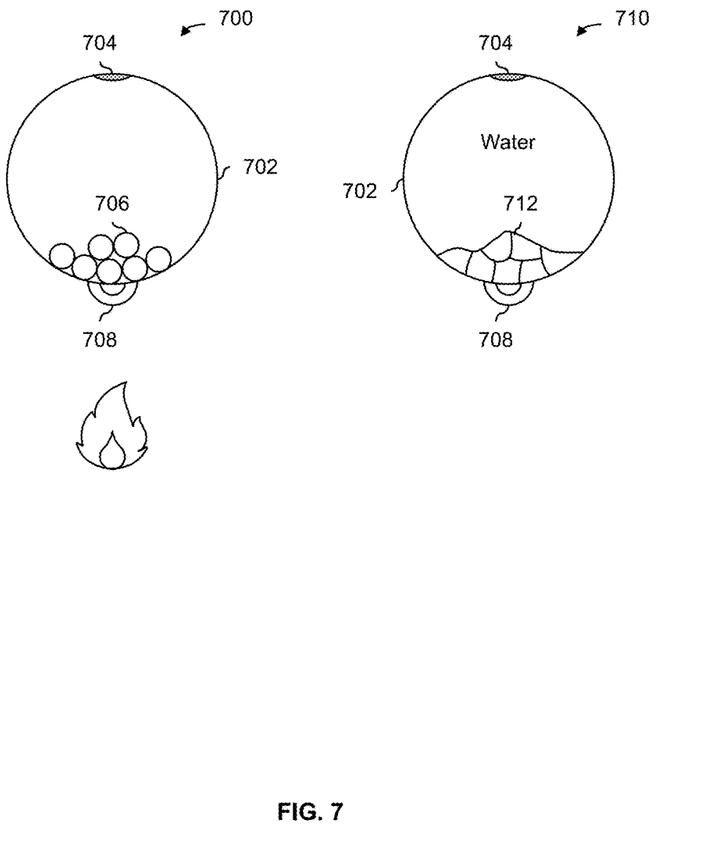
FIG. 7 is a diagram illustrating an embodiment of a training device with internally attached melted weights.

FIG. 7 is a diagram illustrating an embodiment of a training device with internally attached melted weights. In diagram 700, a mooring ball (702) has an opening (704) via which weights (706) are inserted into the mooring ball. The handle (708) is facing down such that the weights gather near the handle inside the mooring ball.

Heat is applied to the weights inside the mooring ball. In this example the weights are metal and the applied heat melts the weights, forming a melted mass (712) which sticks to the inside of the mooring ball. The interior of the mooring ball is then filled with water. See diagram 710. This design causes the mooring ball to orient itself in the water with the handle facing downward.

In some applications, interior weights are desirable because they may cause less damage (e.g., to people or objects around the training device) compared to external weights which may bang against people or other objects. In some applications, interior weights are desirable because the round shape of the training device is maintained which helps the training device rotate in the water.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
using a tether to removably attach a training device to an overwater aircraft which is configured to at least take off and land over water, wherein the training device has a negative buoyancy and includes a tether ball;
in response to the tether ball being pulled completely out of the water, forcing the overwater aircraft to descend due to the out of water weight of the tether ball until the tether ball is at least partially under water, wherein:
the tether enables the overwater aircraft to fly above the water while pulling the training device, via the tether, through the water;
the tether is connected to the training device at a connection point of the training device; and
the training device is configured to have the connection point oriented downward in the water when the overwater aircraft is not pulling on the training device.

2. The method recited in claim 1, wherein when the training device is attached to the overwater aircraft and is pulled via the tether through the water, the overwater aircraft is forced to fly at a lower speed than when the training device is not attached to the overwater aircraft.

3. The method recited in claim 1, wherein the tether is inelastic.

4. The method recited in claim 1, wherein the training device has one or more of the following shapes: a sphere, an ovoid, or a spheroid.

5. A method, comprising: using a tether to removably attach a training device to an overwater aircraft which is configured to at least take off and land over water, wherein the training device has a negative buoyancy and includes a tether ball; in response to the tether ball being pulled completely out of the water, forcing the overwater aircraft to descend due to the out of water weight of the tether ball until the tether ball is at least partially under water, wherein: the tether enables the overwater aircraft to fly above the water while pulling the training device, via the tether, through the water; the tether is connected to the training device at a connection point of the training device; and one or more external weights are connected to the exterior of the training device in the vicinity of the connection point so that the connection point is oriented downward when the aircraft is not pulling on the training device.

6. The method recited in claim 5, wherein when the training device is attached to the overwater aircraft and is pulled via the tether through the water, the overwater aircraft is forced to fly at a lower speed than when the training device is not attached to the overwater aircraft.

7. The method recited in claim 5, wherein the tether is inelastic.

8. A method, comprising: using a tether to removably attach a training device to an overwater aircraft which is configured to at least take off and land over water, wherein the training device has a negative buoyancy and includes a tether ball; in response to the tether ball being pulled completely out of the water, forcing the overwater aircraft to descend due to the out of water weight of the tether ball until the tether ball is at least partially under water, wherein: the tether enables the overwater aircraft to fly above the water while pulling the training device, via the tether, through the water; the tether is connected to the training device at a connection point of the training device; and one or more internal weights are connected to the interior of the training device in the vicinity of the connection point so that the connection point is oriented downward when the aircraft is not pulling on the training device.

9. The method recited in claim 8, wherein when the training device is attached to the overwater aircraft and is pulled via the tether through the water, the overwater aircraft is forced to fly at a lower speed than when the training device is not attached to the overwater aircraft.

10. The method recited in claim 8, wherein the one or more internal weights are melted to the interior of the training device in the vicinity of the connection point so that the connection point is oriented downward when the aircraft is not pulling on the training device.

11. The method recited in claim 8, wherein the one or more internal weights are connected by an adhesive to the interior of the training device in the vicinity of the connection point so that the connection point is oriented downward when the aircraft is not pulling on the training device.

* * * * *